US012510846B2

(12) United States Patent
Hagiwara et al.

(10) Patent No.: US 12,510,846 B2
(45) Date of Patent: Dec. 30, 2025

(54) DEVELOPING DEVICE

(71) Applicant: CANON KABUSHIKI KAISHA, Tokyo (JP)

(72) Inventors: Kazunari Hagiwara, Kanagawa (JP); Takashi Hiramatsu, Tokyo (JP); Yu Fukasawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/802,279

(22) Filed: Aug. 13, 2024

(65) Prior Publication Data

US 2025/0068100 A1 Feb. 27, 2025

(30) Foreign Application Priority Data

Aug. 22, 2023 (JP) ................................ 2023-134586

(51) Int. Cl.
*G03G 15/08* (2006.01)
*G03G 15/01* (2006.01)

(52) U.S. Cl.
CPC ..... *G03G 15/0882* (2013.01); *G03G 15/0121* (2013.01); *G03G 15/0189* (2013.01); *G03G 15/0889* (2013.01)

(58) Field of Classification Search
CPC ........... G03G 15/0882; G03G 15/0121; G03G 15/0189; G03G 15/0889
See application file for complete search history.

(56) References Cited

U.S. PATENT DOCUMENTS

| | | | | |
|---|---|---|---|---|
| 8,755,713 | B2 | 6/2014 | Kawai et al. | |
| 9,354,553 | B2 | 5/2016 | Yoshida et al. | |
| 2018/0011426 | A1* | 1/2018 | Mizutani ............ | G03G 15/0882 |
| 2018/0203381 | A1* | 7/2018 | Massaro, Jr. ...... | G03G 15/0882 |
| 2019/0094759 | A1* | 3/2019 | Matsuzaki ......... | G03G 15/0882 |
| 2019/0278198 | A1* | 9/2019 | Miura ................ | G03G 15/0889 |

FOREIGN PATENT DOCUMENTS

| | | | |
|---|---|---|---|
| JP | H07302034 | A | 11/1995 |
| JP | H08292634 | A | 11/1996 |
| JP | 2012226277 | A | 11/2012 |
| JP | 2014149511 | A | 8/2014 |
| JP | 2015011110 | A | 1/2015 |
| JP | 2017044833 | A | 3/2017 |

* cited by examiner

*Primary Examiner* — Sandra Brase
(74) *Attorney, Agent, or Firm* — ROSSI, KIMMS & McDOWELL LLP

(57) ABSTRACT

A developing device having a developing portion and an agitating member agitating developer in a developer accommodating portion, the developer accommodating portion and the developing portion are connected to each other via an opening portion, and a sealing sheet connected to the agitating member is fixed to a periphery of the opening portion for sealing, and the sealing sheet can be removed from a fixing portion by operation of the agitating member, and, whereby the developer accommodating portion and the developing portion communicate with each other, and in a direction crossing a rotation axis direction of the agitating member, a projecting portion is provided on a downstream side of the fixing portion and on an upstream side of the opening portion, and a height of the projecting portion is higher than a height in a fixing-position projecting portion.

10 Claims, 10 Drawing Sheets

DEVELOPING DEVICE

BACKGROUND OF THE INVENTION

Field of the Invention

The present invention relates to a developing device.

Description of the Related Art

In an electrophotographic-type image forming apparatus such as a printer, a copying machine, a multifunctional machine and the like, a developing device which supplies a toner to an electrostatic latent image formed on a photosensitive drum and develops the same is provided. The developing device has a toner chamber for accommodating the toner. And a supply roller supplies the toner in the toner chamber to a development roller, and the development roller supplies the toner to a surface of the photosensitive drum.

The developing device described in Japanese Patent Application Publication No. H8-292634 includes a toner chamber which accommodates toner, an agitating member which is provided inside of the toner chamber and agitates the toner, and a supply port which supplies the toner from the toner chamber to a development chamber in which the supply roller and a development roller are provided. In Japanese Patent Application Publication No. H8-292634, at the beginning, the supply port between the development chamber and the toner chamber is sealed by a sealing member connected to the agitating member, and when the developing device is attached to an image forming apparatus main-body, opening of the sealing member is automatically performed by a rotating operation of the agitating member.

SUMMARY OF THE INVENTION

However, in the developing device as above, a torque rose in some cases when the sealing of the sealing member was opened. For example, in an inline-type color laser printer in which a plurality of process cartridges operate at the same time, when at least two or more developing devices are operated by a common drive source, a required amount of an input torque becomes larger. As a result, drive becomes unstable, a size increase of a motor is required or the like.

The present invention was made in view of the aforementioned problems and has an object to open a sealing member provided at a toner supply port of a developing device with a simple configuration.

The present invention provides a developing device which can be attached to an image forming apparatus, comprising:

a developer accommodating portion configured to accommodate developer;

a developing portion having a rotatable developer carrying member configured to bear the developer; and an agitating member disposed in the developer accommodating portion and configured to agitate the developer in the developer accommodating portion, wherein the developer accommodating portion and the developing portion are connected to each other via an opening portion;

before the developing device is attached to the image forming apparatus, a sealing sheet connected to the agitating member is fixed to a fixing portion in a periphery of the opening portion such that the opening portion is sealed;

after the developing device is attached to the image forming apparatus, the agitating member is operated, and the sealing sheet is removed from the fixing portion such that the developer accommodating portion and the developing portion communicate with each other;

wherein, a direction in which a rotation axis of the agitating member extends is a first direction, a projecting portion is provided on a downstream side of the fixing portion and on an upstream side of the opening portion in a second direction crossing the first direction; and a height of the projecting portion is higher than at least a part of a height of a fixing-position projecting portion formed at a fixing position.

According to the present invention, a sealing member provided at a toner supply port of a developing device can be opened with a simple configuration.

Further features of the present invention will become apparent from the following description of exemplary embodiments with reference to the attached drawings.

DESCRIPTION OF THE EMBODIMENTS

Hereinafter, with reference to drawings, preferred embodiments of this invention will be exemplifiably explained in detail. However, a dimension, a material, a shape of a component, and relative disposition thereof described in the embodiments are not intended to limit a scope of this invention to them unless otherwise described in particular. Moreover, a material, a shape and the like of a member explained once in the explanation below are similar to those in the initial explanation also in the subsequent explanations unless otherwise described in particular. To configurations and processes not particularly illustrated or described, a well-known art or a publicly known art of the technical field concerned can be applied. Moreover, duplicated explanation might be omitted in some cases.

Embodiment 1

Figure 1:
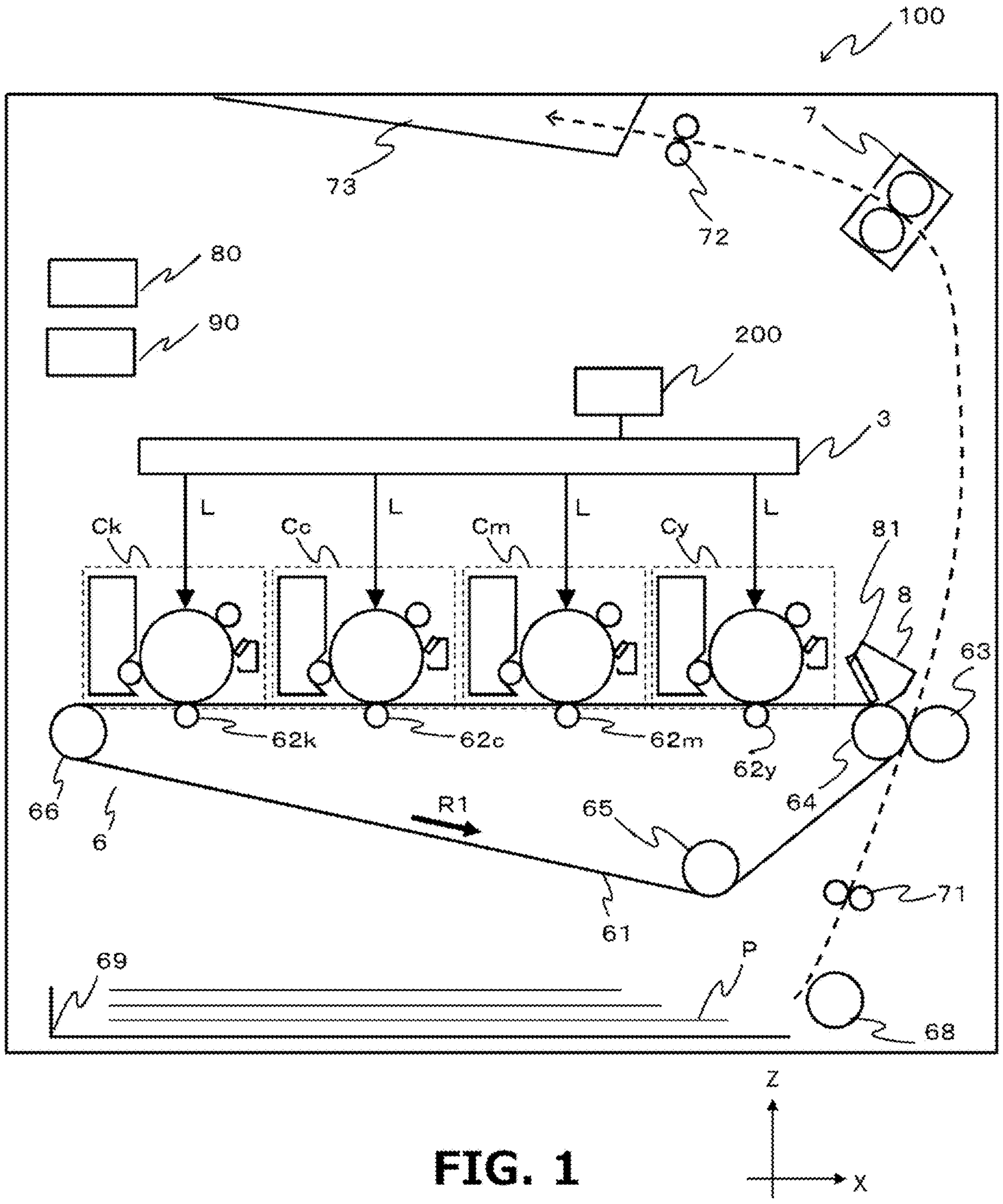
FIG. 1 is a schematic diagram illustrating an example of an image forming apparatus of Embodiment 1.

Entire Configuration of Image Forming Apparatus FIG. 1 is a schematic diagram illustrating a configuration of an image forming apparatus 100 according to the present invention. The image forming apparatus 100 detachably includes process cartridges Cy, Cm, Cc, and Ck which store toners in yellow y, magenta m, cyan c, and black k in an apparatus main body. In a state where the process cartridges Cy, Cm, Cc, and Ck are attached to the apparatus main body, a part of an image forming operation is performed. Hereinafter, when it is not necessary to discriminate colors, suffixes y, m, c, and k will be omitted.

The image forming apparatus 100 includes an intermediate transfer-belt unit 6. The intermediate transfer-belt unit 6 has such a configuration that a transfer belt 61 with flexibility is laid around a turn roller 64, a drive roller 65, and a tension roller 66. The intermediate transfer belt 61 is circulated/moved in an arrow R1 direction when the turn roller 64, the drive roller 65, and the tension roller 66 receive a drive force from a driving portion 90 and rotate. Moreover, in the intermediate transfer-belt unit 6, primary transfer rollers 62*y*, 62*m*, 62*c*, and 62*k* are provided so as to oppose process cartridges Cy, Cm, Cc, and Ck via the intermediate transfer belt 61, respectively. The positions are called primary transfer positions, and at the primary transfer positions, toner images in each of ymck colors are overlapped and transferred from a photosensitive drum 1 to the intermediate transfer belt 61. Moreover, at a position opposed to the turn roller 64 via the intermediate transfer belt 61, a secondary transfer roller 63 is provided. This position is called a secondary transfer position, and at the secondary transfer position, a full-color image is transferred from the intermediate transfer belt 61 to a recording material P.

The recording material P accommodated in a cassette 69 is picked up by a pick-up roller 68 and is conveyed by a conveyance roller pair 71 to the secondary transfer position. When the recording material P having passed the secondary transfer position is heated and pressurized by a fixing device 7, the full-color image is fixed on the recording material. After that, the recording material P is ejected by an ejection roller pair 72 to an ejection tray 73.

In the circulating/moving direction R1 of the transfer belt 61, among four process cartridges, the process cartridge Cy is disposed on an uppermost stream side. On a downstream side thereof, the process cartridge Cm, subsequently, the process cartridge Cc, and the process cartridge Ck is disposed on a lowermost stream side in the four. And on a further lower stream side of each of the primary transfer positions, the secondary transfer positions are positioned. However, the number and alignment of the process cartridges attached to the image forming apparatus are not limited to them but are set as appropriate as necessary.

A control portion 200 controls an image forming operation on the basis of image information. The control portion 200 can use an information processing device including arithmetic resources such as a CPU, a memory, a ROM, a RAM and the like and a control circuit. A power source 80 is a high-voltage power-source device and supplies a charging voltage, a transfer voltage and the like at the image forming operation. The driving portion 90 is a motor or the like and controls rotation or drive of various members by transmitting a drive force by using transmitting means such as a gear and a belt.

Configuration of Process Cartridge

Figure 2:
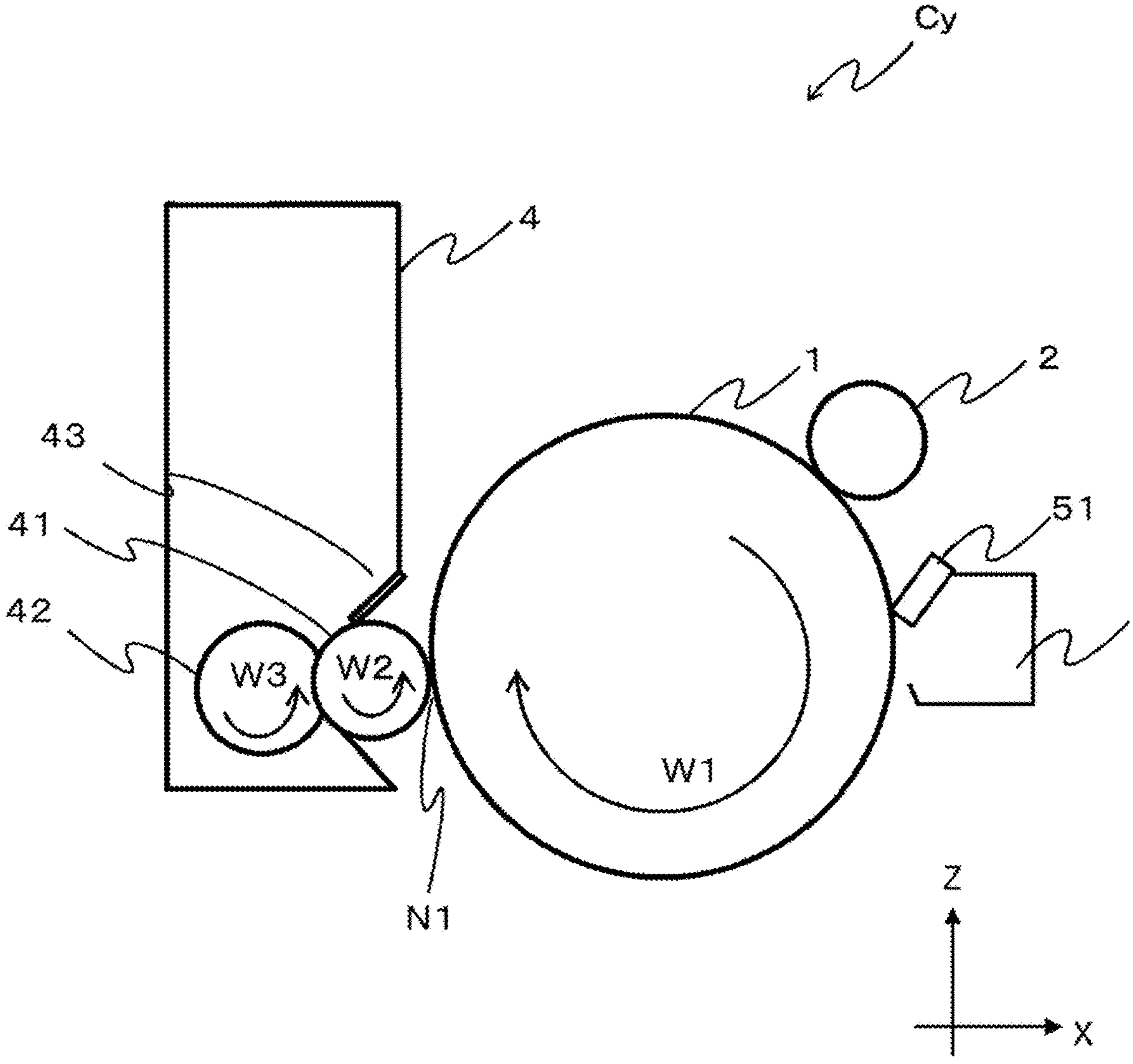
FIG. 2 is a schematic diagram illustrating an example of a process cartridge of Embodiment 1.

By using FIG. 2, a configuration of a process cartridge according to the present invention will be explained. FIG. 2 is a schematic sectional diagram illustrating a configuration of the process cartridge Cy according to the present invention. Note that the process cartridges Cm, Cc, Ck have different toner colors to be stored but the same configuration as that of the process cartridge Cy in the other points.

The process cartridge Cy includes the photosensitive drum 1 as an image bearing member, a charging roller 2 as charging means, a developing device 4, and a photosensitive-drum cleaner 5. The developing device 4 stores a non-magnetic one-component toner (a developer and shall be referred to simply as a toner below) in a negative charging characteristic to which an external additive is caused to adhere to a surface and includes a development roller 41 as a rotatable developer carrying member and a supply roller 42 as supply means. The supply roller 42 is a roller capable of containing the toner inside and constituted by a foaming member and, by means of rotation in contact with the development roller 41, supplies the toner to the surface of the development roller 41. After that, by means of a regulating blade 43 for regulating a toner amount on the development roller, an amount of the toner on the development roller is adjusted. The photosensitive drum 1 rotates in an arrow W1 direction and receives toner supply from the development roller 41 rotating in an arrow W2 direction. Here, the supply roller 42 supplies the toner to the development roller 41 while rotating in the same direction (arrow W3) as that of the development roller 41, but it may rotate in a direction opposite to that of the development roller 41.

Image Forming Process

At image formation, first, a surface of the photosensitive drum 1 is uniformly charged by the charging roller 2. Subsequently, on the basis of an output calculated by the control portion 200 from image information input from a host device, a surface of the charged photosensitive drum 1 is irradiated with a laser beam L emitted from a scanner unit (exposure device 3) as exposing means. As a result, an electrostatic latent image according to the image information is formed on the photosensitive drum 1.

Subsequently, the electrostatic latent image formed on the photosensitive drum 1 is developed as a toner image by the developing device 4. At this time, the supply roller 42 supplies the toner accommodated in the developing device 4 to the development roller 41, while rotating in the arrow W3 direction, and the development roller 41 supplies the toner to the surface of the photosensitive drum 1 while rotating in the arrow W2 direction. As a result, the electrostatic latent image on the photosensitive drum is actualized. And to the primary transfer roller 14, a voltage in a polarity opposite to the normal charging polarity of the toner is applied from the power source 80 (primary-transfer voltage power source) as primary-transfer voltage applying means. As a result, the toner image on the photosensitive drum 1 is primarily transferred onto the intermediate transfer belt 61. At formation of a full-color image, the aforementioned process is sequentially performed for the process cartridges Cy, Cm, Cc, and Ck, and toner images in each color are then overlapped on the intermediate transfer belt 61 and are primarily transferred.

After that, synchronously with movement of the intermediate transfer belt 61, the recording material P is conveyed to the secondary transfer portion. Then, to the secondary transfer roller 63, a voltage in a polarity opposite to the normal charging polarity of the toner is applied from the power source 80 (secondary-transfer voltage power source) as secondary-transfer voltage applying means. As a result, the four-colored toner image on the intermediate transfer belt 61 is secondarily transferred in a lump sum onto the recording material P.

The recording material P on which the toner image has been transferred is conveyed to the fixing device 7 as fixing means. In the fixing device 7, heat and a pressure are applied to the recording material P, whereby the transferred toner image is fixed and ejected to the ejection tray 73.

Note that the developing device 4 is configured to perform a reversal development by causing the development roller 41 as a developer carrying member in contact with the photosensitive drum 1 while giving a speed difference in order to control a development amount of the toner as the developer. That is, the developing device 4 which develops an electrostatic image by causing the toner charged in the same polarity (negative polarity in the present invention) as the charging polarity of the photosensitive drum 1 to adhere to a part (image portion, exposure portion) in which a charge is attenuated by exposure on the photosensitive drum 1 was used. In this Embodiment, the development roller 41 is moved with a speed ratio of 1.4 times of that of the photosensitive drum 1.

Subsequently, control of the image forming process will be explained in more detail. Note that numerical values of bias or the like described here are only examples, and the values are not limiting but are set as appropriate as necessary. Moreover, a bias (voltage) applied to each member is supplied from the power source 80 as bias supply means on the basis of a value controlled by the control portion 200.

When the control portion 200 receives image information, it first drives a main motor included in the driving portion 90. By means of this main motor, rotation of the photosensitive drum 1 of each of the process cartridges Cy, Cm, Cc, and Ck and circulating movement of the intermediate transfer belt 61 are started. Moreover, in conjunction with the rotation of the photosensitive drum 1, rotation of the development roller 41 and the supply roller 42 are also started.

In parallel with the driving of the main motor, the power source 80 applies a charging bias at −1000 V to the charging roller 2. As a result, the photosensitive drum 1 is substantially uniformly charged by the charging roller 2 by rotating in the direction of the arrow W1. At this time, on the surface of the photosensitive drum 1, a dark-part potential Vd at −500 V is formed.

At a timing when the image forming process is started, and the surface appropriately charged by the charging roller 2 in the surface of the photosensitive drum 1 has passed a position, which is the closest to the developing device 4, the development roller 41 is brought into contact with the photosensitive drum 1.

Subsequently, on the basis of the image information, the control portion 200 causes a laser beam to be emitted from the exposure device 3. As a result, on the surface of the photosensitive drum 1, an electrostatic latent image (bright part potential V1) at −100 V is formed.

This electrostatic latent image moves with the rotation of the photosensitive drum 1 to a development nip N1, which is a contact position between the photosensitive drum 1 and the development roller 41. At this time, the power source 80 applies a bias (development bias Vdc) at −300 V to the development roller 41. This potential difference visualizes the electrostatic latent image by supplying a toner to the electrostatic latent image from the development roller 41 and forms a toner image (developer image). Moreover, the power source 80 applies a supply bias at −400 V to the supply roller 42. This potential difference promotes the supply of the toner from the supply roller 42 to the development roller 41.

The toner image formed on the photosensitive drum 1 moves to a primary transfer position, that is, the contact position between the photosensitive drum 1 and the transfer belt 61. At that time, the power source 80 applies the primary transfer bias at +500 V to the primary transfer roller 62*y*. This potential difference causes primary transfer of the toner image to the surface of the intermediate transfer belt 61. The toner image having been primarily transferred onto the intermediate transfer belt 61 is conveyed to a secondary transfer position, which is a nip portion between the secondary transfer roller 63 and the turn roller 64 by circulating movement of the intermediate transfer belt 61. By the primary transfer to the intermediate transfer belt 61 in an overlapping manner of each color, a four-color image is formed. And the toner image is secondarily transferred to the recording material P at the secondary transfer position. The toner image having been secondarily transferred onto the recording material P is pressurized and heated by the fixing device 7 so as to be fixed to the recording material P and to become a final image.

On the other hand, in the toner image formed on the photosensitive drum 1, the toner which was not transferred to the intermediate transfer belt 61 but remained is raked by a cleaning blade 51 in contact with the photosensitive drum 1 and is recovered by the photosensitive-drum cleaner 5. Moreover, in the toner image formed on the transfer belt 61, the toner which was not transferred to the recording material P but remained is conveyed to a cleaning device 8. The cleaning device 8 includes the cleaning blade 81 brought into contact with the transfer belt 61 with elasticity and rakes the toner from the surface of the transfer belt 61.

After a process of forming a toner image on the photosensitive drum 1 is finished, the development roller 41 is separated from the photosensitive drum 1, and the bias having been applied to the charging roller 2, the development roller 41, and the supply roller 42 is cut out. And after all the processes of the secondary transfer, the fixation and the like are finished, the driving of the main motor is stopped.

Configuration of Developing Device

Figure 3A:
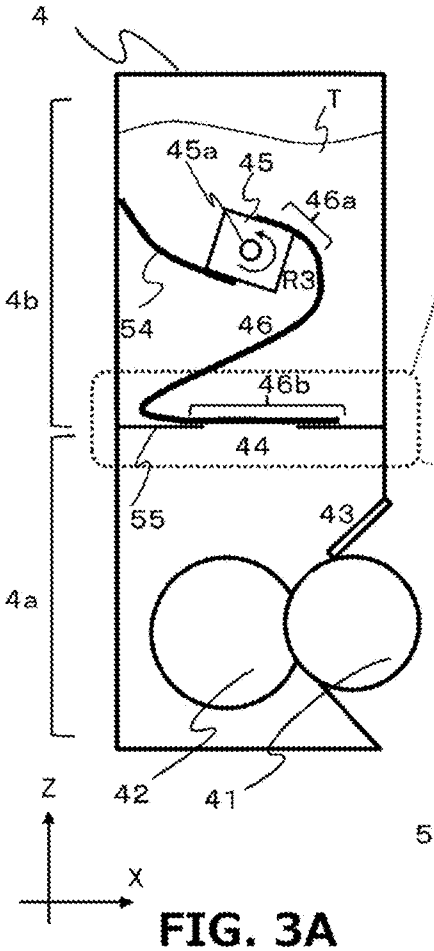
FIGS. 3A to 3C are schematic diagrams for explaining a developing tool configuration of Embodiment 1.
Figure 3B:
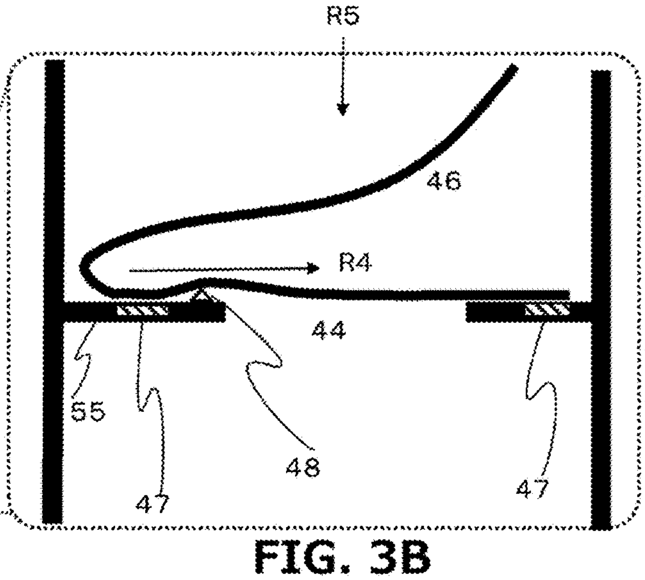
Figure 3C:
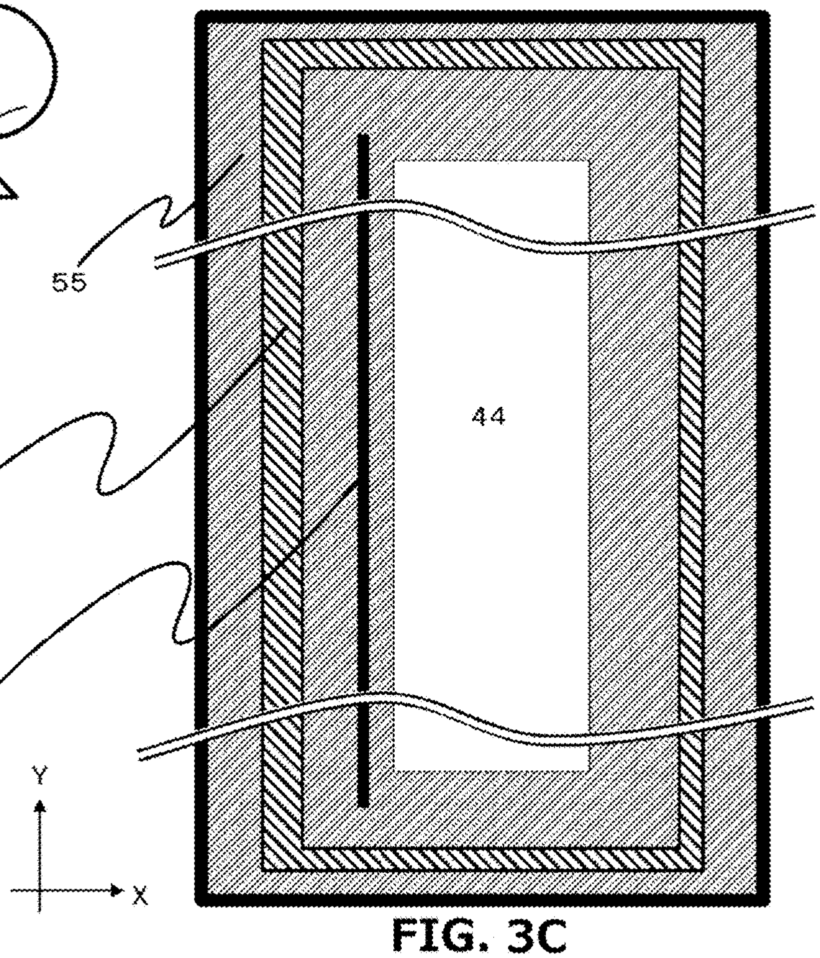

The developing device 4 in this Embodiment will be explained by using FIGS. 3A to 3C. As shown in FIG. 3A, the developing device 4 has a development portion 4*a* having the development roller 41 and the supply roller 42 and a developer accommodating portion 4*b* which accommodates a toner, which is a developer, partitioned from each other by a partition plate 55. The development portion 4*a* and the developer accommodating portion 4*b* are connected to each other by an opening portion 44 provided in the partition plate 55. In a state where the developing device 4 is unused after shipment from a plant, a sealing sheet 46 is disposed at the opening portion 44 for preventing movement of the toner from inside of the developer accommodating portion 4*b* to the development portion 4*a*. As shown in FIG. 3B, the sealing sheet 46 is fixed at a fixing portion 47. Moreover, in this Embodiment, in the sealing sheet 46, the other end portion 46*a* on a side opposite to one end portion 46*b* fixed to the fixing portion 47 is fixed to/supported by an agitating member 45 which agitates the toner in the developer accommodating portion 4*b* and is rotatable around an agitating shaft 45*a*. However, the agitating member 45 may extend farther than the fixed position. The agitating member 45 further supports an agitating sheet 54 rotated with the rotation of the agitating member 45 and agitates and conveys the toner. Note that, the sealing sheet 46 after the fixation is released can be also used as the agitating sheet.

As a material of the sealing sheet 46, polyethylene terephthalate was used. As a fixing method of the sealing sheet 46, thermal welding was used. In addition, ultrasonic welding or the like, for example, can be also used. At initial use of the process cartridge including the aforementioned developing device 4, after attachment of the process cartridge to the image forming apparatus main-body, with the rotation in an R3 direction of the agitating member 45 to which a driving force was transmitted from the main body, the sealing sheet 46 is removed from the opening portion 44. After that, the agitating sheet 54 and the sealing sheet 46 agitate the toner inside of the developer accommodating portion 4*b* by the rotation of the agitating member 45, whereby the toner is supplied from the developer accommodating portion 4*b* to the development portion 4*a*.

FIG. 3B is an enlarged view of the surrounding of an opening portion in a state where the sealing sheet 46 is fixed. With the rotation of the agitating member 45 in the R3 direction, in an R4 direction (second direction) in which the sealing sheet 46 is removed from the fixing portion 47, a projecting portion 48 is formed on a downstream of the fixing portion 47. FIG. 3C is a diagram illustrating a plane including the opening portion 44 when viewed from an R5 direction in FIG. 3B in a state where the sealing sheet 46 is removed. As shown in FIG. 3C, the projecting portion 48 is formed in a state connected in series in a direction in which a rotation axis of the agitating member 45 extends (direction in which an axis of the development roller 41 extends). The direction in which the sealing sheet 46 is removed from the fixing portion is a direction crossing (typically orthogonal to) the direction in which the rotation axis of the agitating member 45 extends. The direction in which the rotation axis of the agitating member 45 extends is referred to as a first direction and the direction crossing the first direction and in which the projecting portion 48 is formed as a second direction.

A manufacturing method of the projecting portion 48 is not particularly limited and may be integrally molded with the partition plate 55, or a separate member may be bonded after the manufacture of the partition plate 55, for example. A bonding method of the separate member is also arbitrary such as an adhesive, thermal bonding or the like. Moreover, the projecting portion 48 may be formed of a resin or the like on the partition plate 55. A material of the projecting portion 48 is not particularly limited, either, but the same material as that of the developing device 4 is preferable, and polystyrene, polyacetal or the like can be used, for example.

COMPARATIVE EXAMPLE

Figure 10A:
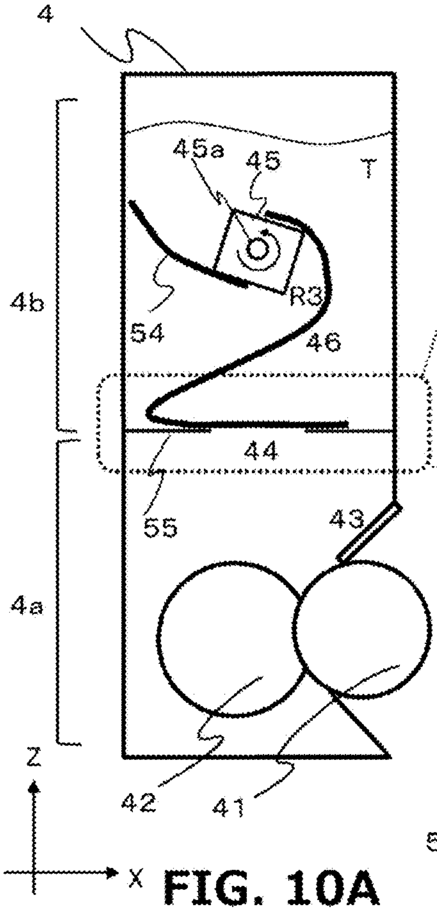
FIGS. 10A to 10C are schematic diagrams for explaining a developing tool configuration of Comparative Example.
Figure 10B:
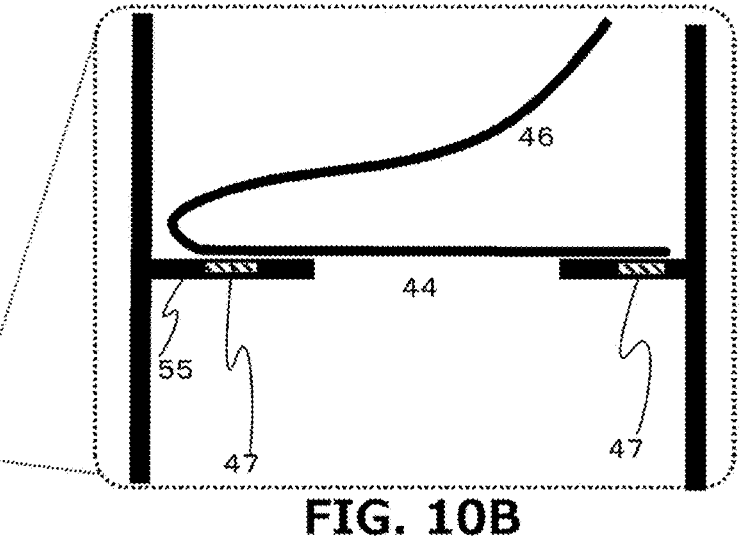
Figure 10C:
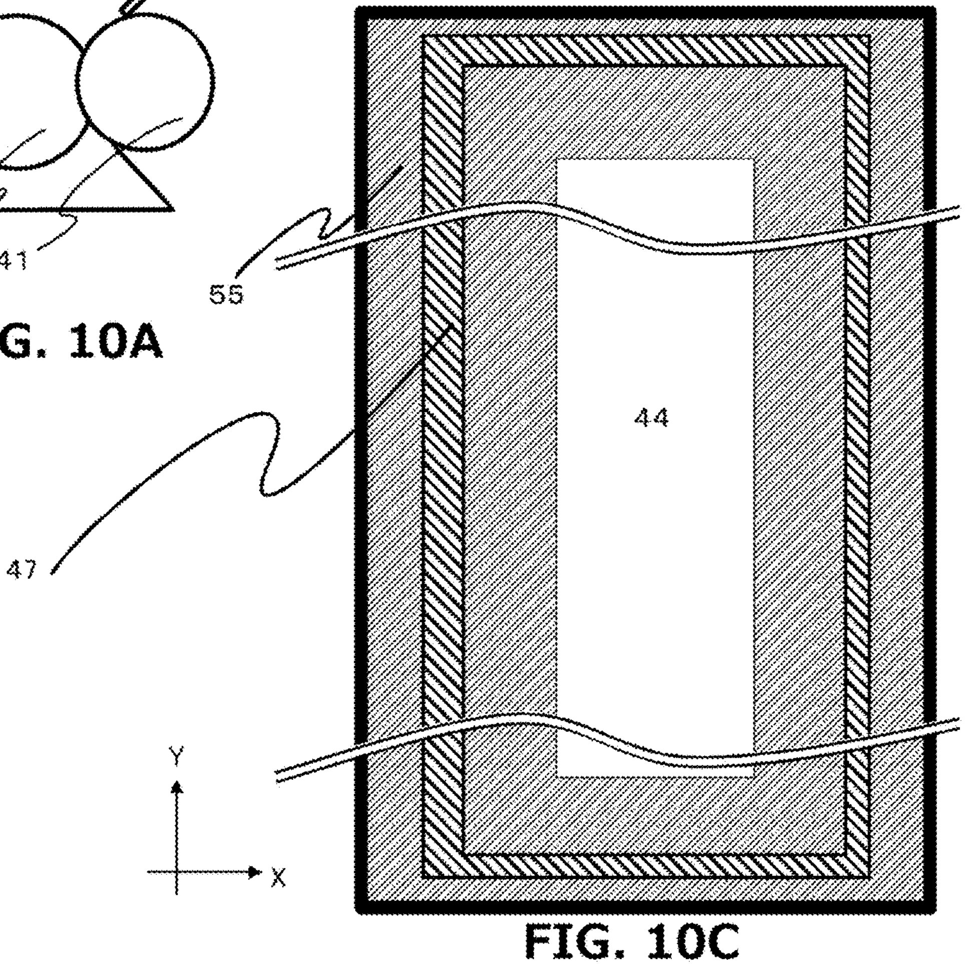

On the other hand, FIGS. 10A to 10C illustrate a configuration of the developing device 4 according to prior arts as Comparative Example. As shown in FIGS. 10B and 10C, Comparative Example is different from Embodiment 1 in a point that the projecting portion 48 is not provided on the partition plate 55.

Comparison Between Embodiment 1 and Comparative Example

As the results of keen examinations by the inventors, it was confirmed that, in Embodiment 1, a torque when the sealing sheet 46 is opened is lowered as compared with Comparative Example. The reason for that is considered to be as follows, which will be explained by using FIGS. 4A to 4C, FIGS. 5A to 5D.

Figures 4A, 4B, 4C:
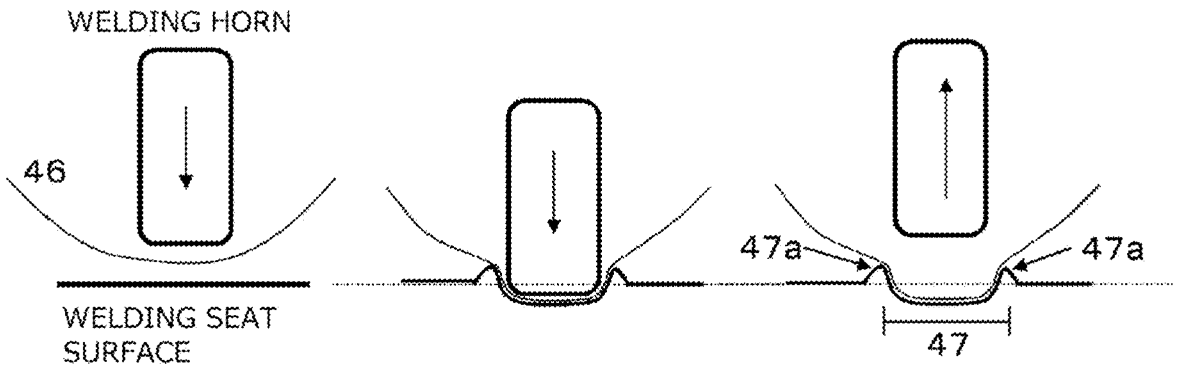
FIGS. 4A to 4C are schematic diagrams for explaining a welding method of a sealing sheet.

FIGS. 4A to 4C illustrate schematic sectional diagrams when the sealing sheet 46 is welded to a welding seat surface. In order to weld the sealing sheet, a welding horn heated to a predetermined temperature operates in an order of FIG. 4A→FIG. 4B→FIG. 4C. At this time, welding of the welding seat surface causes deformation as in FIG. 4B, irregularity is formed, and the sealing sheet 46 is fixed to the fixing portion 47. And when the welding horn is separated from the sealing sheet 46, the fixing portion 47 fixed to the sealing sheet 46 and recessed from the partition plate 55 as a recessed portion and a fixing-position projecting portion 47*a* projecting from the partition plate 55 are formed on both sides of the fixing portion 47.

Figure 5A:
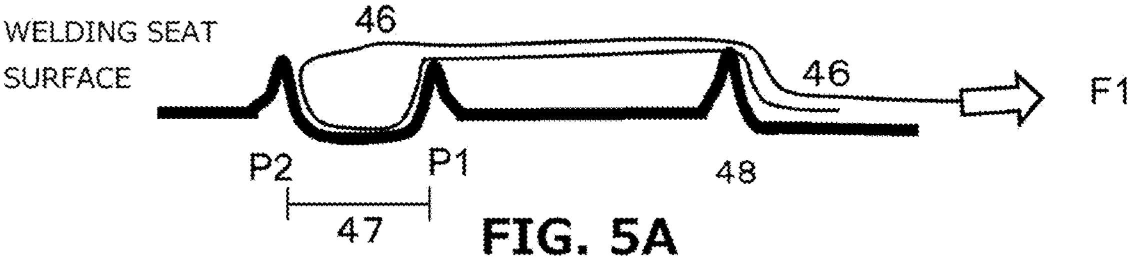
FIGS. 5A to 5D are schematic diagrams for explaining opening of the sealing sheet.
Figure 5B:
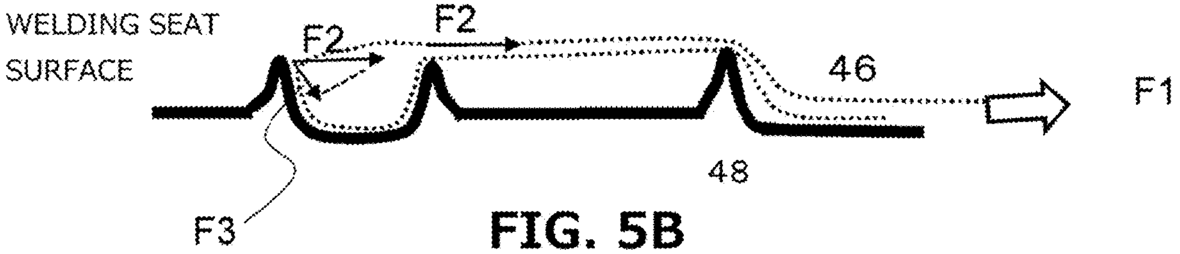
Figure 5C:
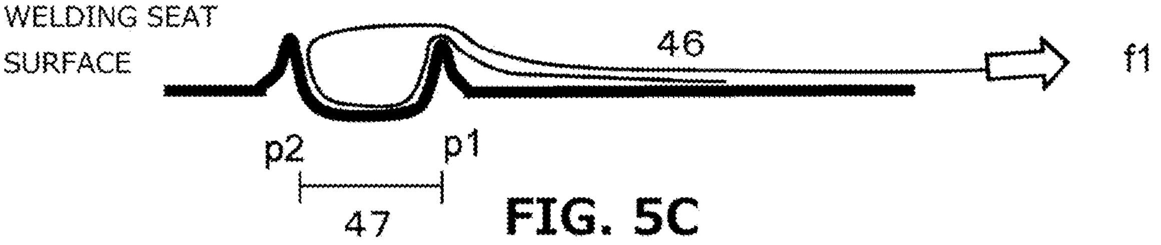
Figure 5D:
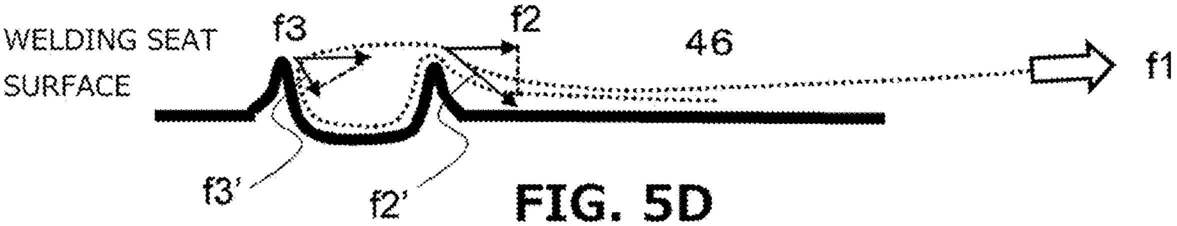

FIGS. 5A to 5D illustrate a state in which the sealing sheet 46 fixed to the fixing portion 47 with this irregularity formed is removed from the fixing portion 47 and is opened. FIGS. 5A to 5D are enlarged sectional diagrams of the vicinity of the sealing sheet 46, the fixing portion 47, and the projecting portion 48. FIGS. 5A and 5B are Embodiment 1, and FIGS. 5C and 5D illustrate Comparative Example. FIGS. 5A and 5C illustrate a state where the sealing sheet 46 is fixed to the fixing portion 47, while FIGS. 5B and 5D illustrate how a force acts when the sealing sheet 46 (indicated by a dotted line) is opened.

When the sealing sheet 46 in Embodiment 1 is to be opened, as shown in FIG. 5A, first, a force F1 is transmitted to the sealing sheet 46 by the rotation of the agitating member 45. Then, as shown in FIG. 5B, since the sealing sheet is supported by the projecting portion 48, a force F2 is transmitted to a position P2 via a position P1. Then, at the position P2, a component force F3 of the force F2 acts as a force of peeling the sealing sheet 46 off the welding seat surface.

On the other hand, in the configuration of Comparative Example, the transmitted power is smaller than the case of Embodiment 1. The reason for that will be described by using FIGS. 5C and 5D. As shown in FIG. 5C, by means of the rotation of the agitating member 45, a force f1 is first transmitted to the sealing sheet 46. Here, unlike the case of Embodiment 1, as shown in FIG. 5D, the force f1 is divided into a force f2 and a component force f2' at the position p1, and the component force f2' acts as a force which peels the sealing sheet 46 off the welding seat surface. The force f2 is divided into a force f3 and a component force f3' at the position p2, and the component force f3' acts as a force which peels the sealing sheet 46 off the welding seat surface. That is, in Comparative Example, at the position p1, a loss of force occurred more than the case of Embodiment 1 by a portion that the component force f2' acts in a direction different from a direction connecting the position p1 and the position p2. As a result, it is considered that, in Embodiment 1, a torque required for opening becomes smaller than that of Comparative Example. As the result of keen examination by the inventors in particular, it was known that the larger in the amount of the toner in the toner accommodating portion is, the more visible the aforementioned difference in the torque becomes. The reason for that is considered to be such that the sealing sheet 46 has deformed to a shape close to FIG. 5C due to the weight of the toner.

As described above, in this Embodiment, such developing device 4 having the development portion 4*a* and the developer accommodating portion 4*b* that the developer accommodating portion 4*b* is located at a location upper in the gravity direction than the development portion 4*a* is used in a state where the developing device 4 is attached to the image forming apparatus 100. And when the opening portion 44 is provided in the partition member dividing the development portion 4*a* and the developer accommodating portion 4*b* from each other, in the direction in which the sealing sheet 46 is removed due to the rotation of the agitating member 45, the projecting portion 48 is provided on the downstream side of the fixing portion 47 and on the upstream side of the opening portion 44. Moreover, the projecting portion 48 is configured to extend in the direction preferably along the rotation axis of the agitating member 45. As a result, in this Embodiment, the torque when the sealing sheet 46 is peeled off can be lowered. Particularly, when the toner is filled in the developer accommodating portion 4*b*, and a weight is applied to the sealing sheet 46, the effect of lowering the required torque becomes higher.

Note that a top part of the projecting portion 48 is more preferably a sharp shape than a flat shape. Note that, since the effect of lowering the torque can be obtained by the presence itself of the projecting portion 48, a height of the projecting portion 48 does not necessarily have to be within a certain range. However, the height of the projecting portion 48 is preferably higher than at least a part of the height in the fixing-position projecting portion 47*a*. Moreover, as shown in FIGS. 5A to 5D, if the height of the projecting portion 48 from the partition plate 55 is approximately at the same degree as the height of the fixing-position projecting portion 47*a* of the fixing portion 47 from the partition plate 55, the effect can be obtained more easily, and the height of the projecting portion 48 may be set within a predetermined range from the height of the fixing-position projecting portion 47*a*, for example. As an example of the predetermined range, an upper limit of the height of the projecting portion 48 is +20% or less from the height of the fixing-position projecting portion 47*a*. If the height of the projecting portion 48 exceeds +20% with respect to the fixing-position projecting portion 47*a*, there is a possibility that sealing performances lower. Regarding a lower limit of the height of the projecting portion 48, if at least the projecting portion is provided, an effect according to that can be obtained.

Embodiment 2

Figure 6A:
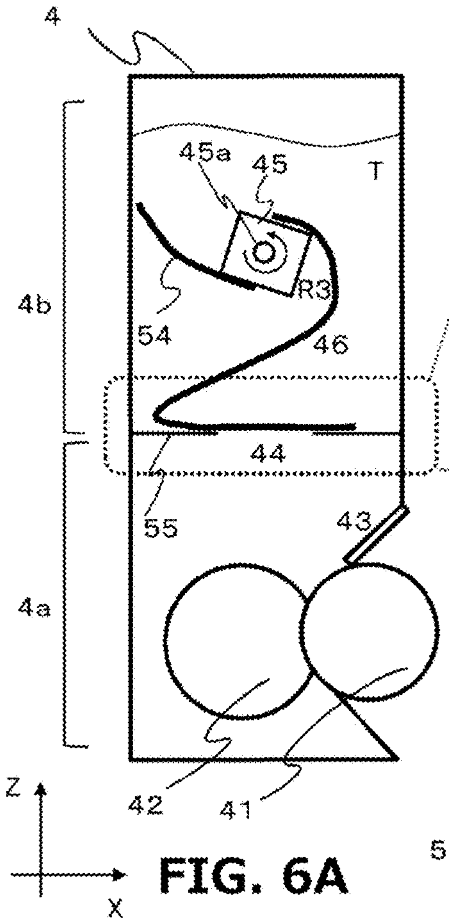
FIGS. 6A to 6C are schematic diagrams for explaining a developing tool configuration of Embodiment 2.
Figure 6B:
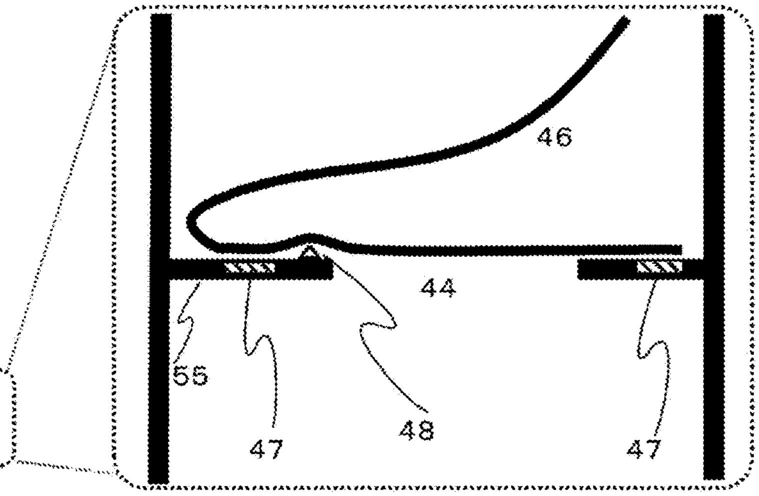
Figure 6C:
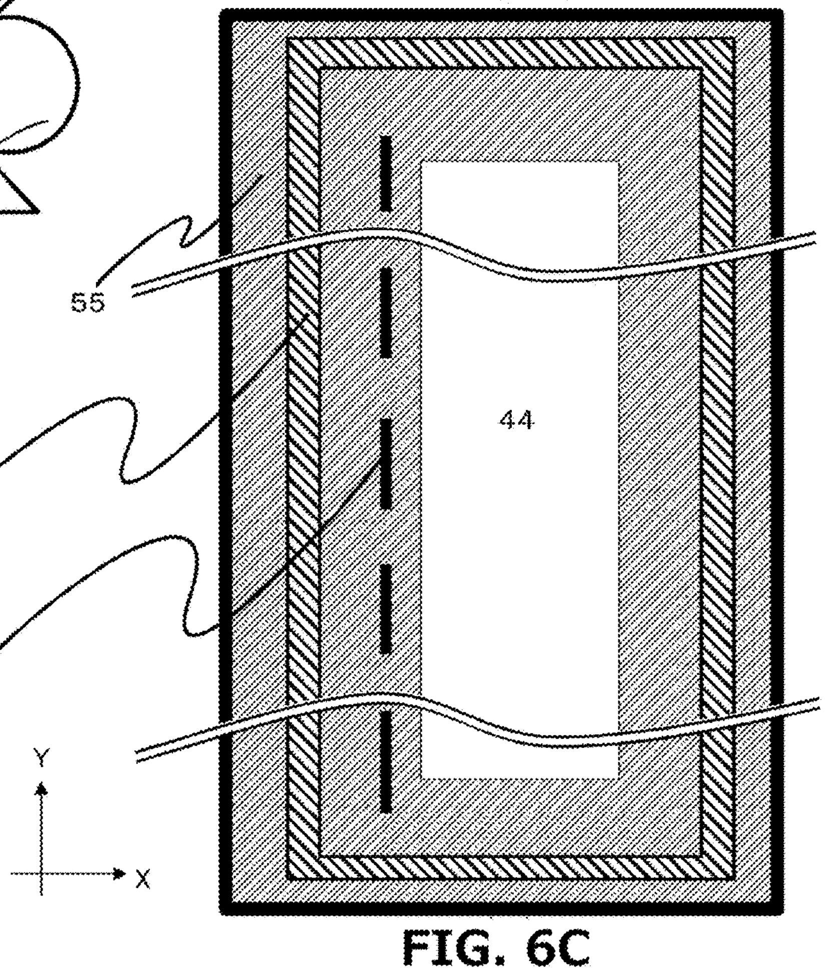

Subsequently, with reference to the drawings, Embodiment 2 of the present invention will be explained. For the same parts as those in Embodiment 1, explanation will be omitted. In Embodiment 2, as shown in FIG. 6C, the projecting portion 48 provided on the partition plate 55 is discontinuous, and there are some parts where the projecting portion is not present.

In the case of this Embodiment, as compared with Embodiment 1, the torque lowering amount is small for the portion of the discontinuous parts in the projecting portion 48. However, as compared with Comparative Example, since the projecting portion 48 is provided on the downstream side of the fixing portion 47 in the direction in which the sealing sheet 46 is peeled off, the toque at the opening could be lowered. That is, it is known that, in the direction in which the sealing sheet 46 is peeled off, the projecting portion 48 connected in series does not necessarily have to be provided at all the positions on the downstream side of the fixing portion 47 and on the upstream side of the opening portion 44. In other words, the shape of the projecting portion 48 does not have to be continuous but may be intermittent. Typically, a plurality of the projecting portions 48 are provided with a gap. By providing the projecting portions 48 at least at some positions on the downstream side of the fixing portion 47, the effect of lowering the torque at the opening can be obtained to a varying degree.

Embodiment 3

Subsequently, with reference to the drawings, Embodiment 3 of the present invention will be explained. For the same parts as those in Embodiments 1 and 2, explanation will be omitted. Embodiment 3 illustrates a particularly preferred example when a recycled article of the developing device 4 is used. In Embodiment 3, as shown in FIGS. 7B and 7C, a point that the projecting portion 48 is connected in series so as to surround the outer periphery of the opening portion 44 is different from Embodiment 1.

Figure 7A:
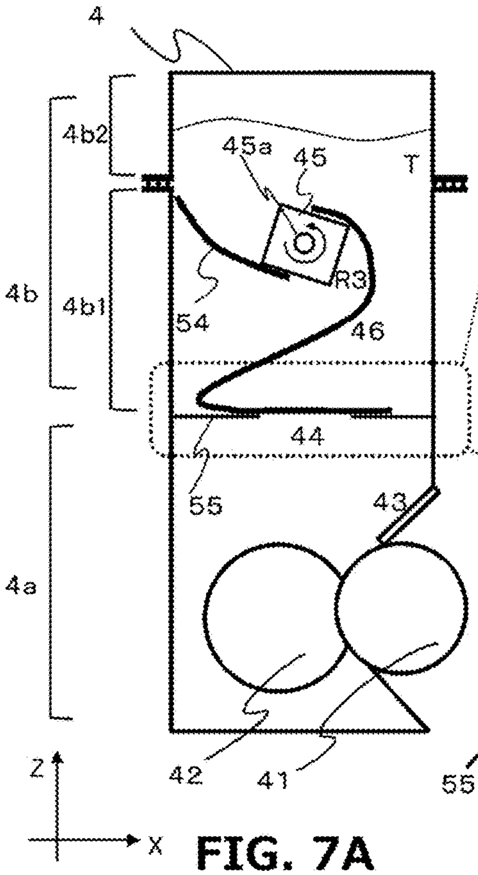
FIGS. 7A to 7C are schematic diagrams for explaining a developing tool configuration of Embodiment 3.
Figure 7B:
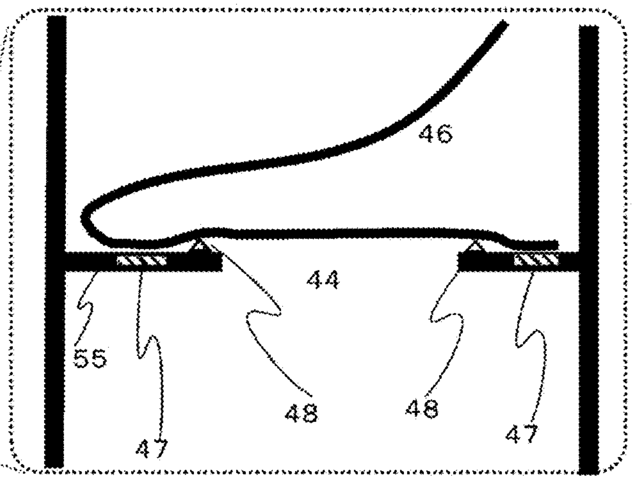
Figure 7C:
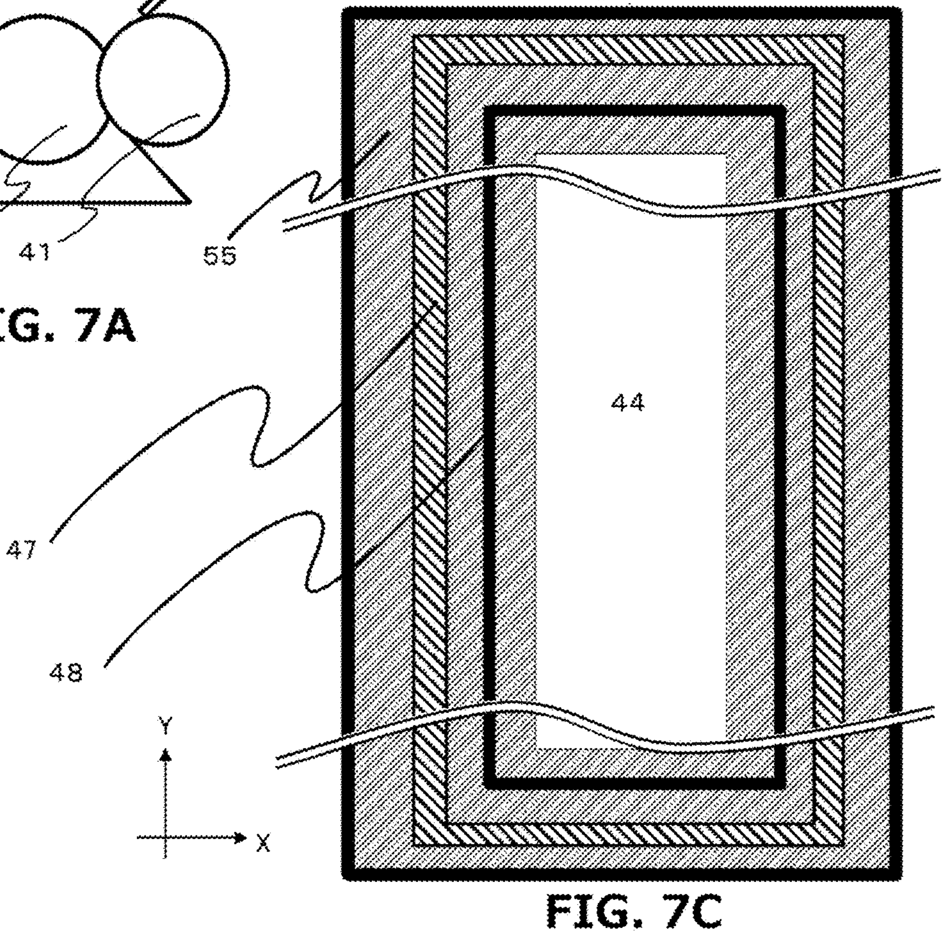
Figure 8A:
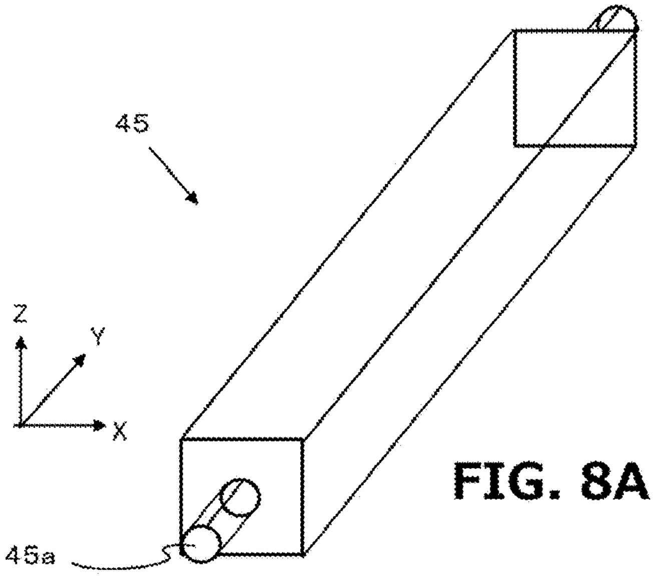
FIGS. 8A to 8C are schematic diagrams for explaining an agitating-member rotation axis and a rotation bearing of Embodiment 3.
Figure 8B:
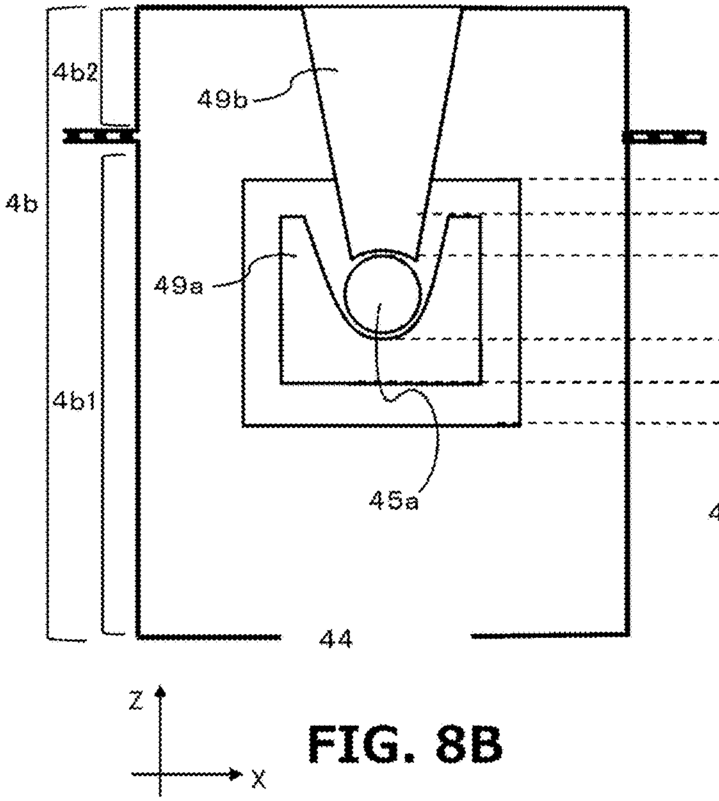
Figure 8C:
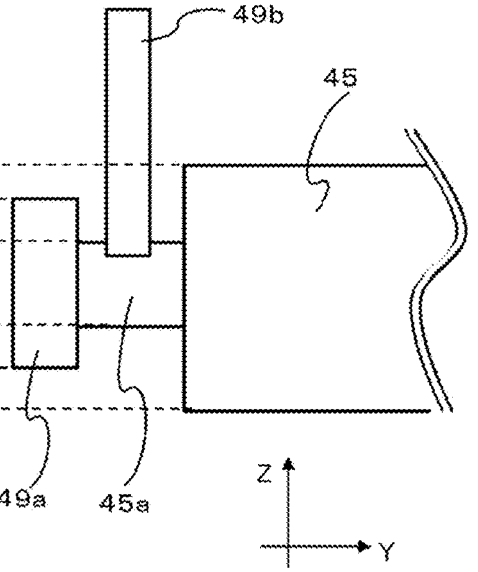

In Embodiment 3, as shown in FIG. 7A, the developer accommodating portion 4*b* is manufactured by combining and fixing a first accommodating-chamber member 4*b*1 and a second accommodating-chamber member 4*b*2, which are separate components. FIG. 8A illustrates the agitating member 45 and the agitating shaft 45*a* used for the developing device 4. Moreover, FIGS. 8B and 8C illustrate a state where a first agitating-shaft holding portion 49*a* is attached to the first accommodating-chamber member 4*b*1 and a second agitating-shaft holding portion 49*b* to the second accommodating-chamber member 4*b*2 in order to hold the agitating shaft 45*a* as above.

Embodiment 3 reuses the developing device 4 which was once used. Specifically, the projecting portion 48 used to be a fixing portion of the sealing sheet 46 in the (non-recycled) developing device 4 in a first use. And at the re-use, it functions as the projecting portion 48 for lowering the torque.

Here, there are cases where an increase of the torque of the main body at the re-use is difficult and thus, it is preferable that a required amount of the opening torque of the developing device 4 at the re-use is equal to or smaller than the torque at the first opening. In addition, in the conventional re-used articles, a welding surface was formed so that the fixing portion of the first welding seat surface is covered one round for stabilization of the sealing performance. Therefore, an area of the welding surface at the re-use is larger. As a result, the increase in the opening torque of the sealing sheet is concerned about.

On the other hand, in this Embodiment, in the re-used article, the fixing portion 47 is constituted on an outer side of the projecting portion formed in the first fixing portion, and since the first fixing portion functions as the projecting portion 48, the opening torque at the re-use can be made also equal to or smaller than the degree at the first one. That is, at the re-use, too, high toner sealing performance can be obtained while the increase in the opening torque is suppressed.

Moreover, the developer accommodating portion 4*b* is configured to be capable of being easily separated into the first accommodating-chamber member 4*b*1 and the second accommodating-chamber member 4*b*2 and furthermore, such a configuration is used that the first accommodating-chamber member 4*b*1 and the second accommodating-chamber member 4*b*2 hold the agitating member. Thus, at the recycling, cleaning of the developer accommodating portion and taking out of the agitating member are easy. Particularly when the welding seat surface has residual toner adhesion, the sealing performance at the welding of the sealing sheet is lowered, but in this example, cleaning is easily performed and thus, high toner sealing performance can be obtained.

Note that, in this Embodiment, on the premise that the developing device 4 is to be re-used, such a configuration was adopted that the fixing portion 47 is provided further in the periphery of the projecting portion 48 (fixing portion at the initial use, that is, at the time of a non-reused article) in the periphery of the opening portion 44 in the partition plate 55. However, it may be such a configuration that the projecting portion 48 is provided in the periphery of the opening portion 44 at the time of the non-reused article, and the fixing portion 47 is provided further in the periphery thereof. Moreover, in this Embodiment, the developer accommodating portion 4*b* is made capable of being easily disassembled/assembled by using the first accommodating-chamber member 4_b_1 and the second accommodating-chamber member 4_b_2. The assembling configuration as above may be used in combination with the configurations of the projecting portion 48 and the fixing portion 47 of this Embodiment or may be used singularly.

Embodiment 4

Figure 9A:
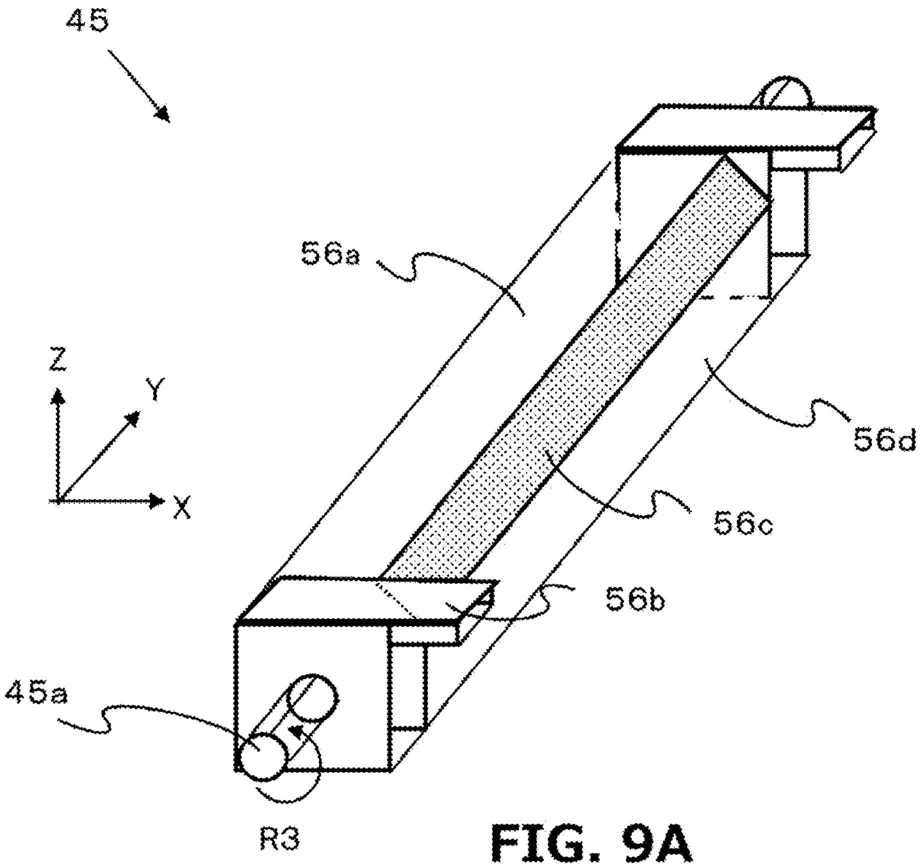
FIGS. 9A to 9C are schematic diagrams for explaining an agitating member of Embodiment 4.
Figure 9B:
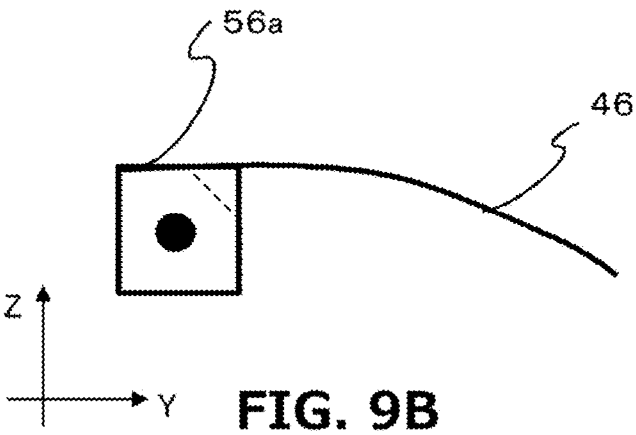
Figure 9C:
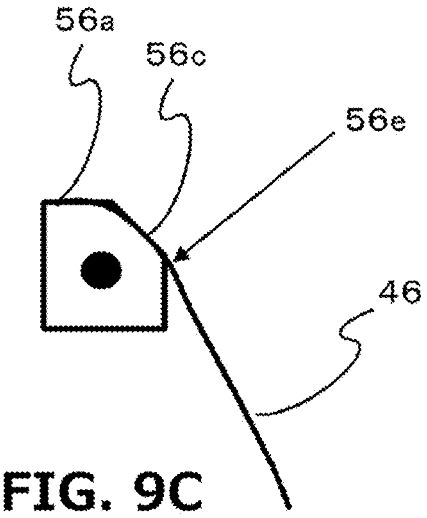

Subsequently, in Embodiment 4, an example in which the agitating member 45 is different as compared with Embodiment 3 will be explained by using FIGS. 9A to 9C. The agitating member 45 in this Embodiment shown in FIGS. 9A to 9C include a center-part fixing portion 56_a_ located at a center part in the first direction and an end-part fixing portion 56_b_ located at an end part in the first direction for fixing the sealing sheet 46. Here, a length of the end-part fixing portion 56_b_ in the second direction is shorter than a length of the center-part fixing portion 56_a_ in the second direction. As a result, regarding the end-part fixing portion 56_b_, a free length of the sealing sheet 46 becomes shorter than the center-part fixing portion 56_a_ and thus, a torque for opening the end part of the sealing sheet 46 can be made smaller.

In addition, in this Embodiment, at the center part of the agitating member 45, a corner part surface 56_c_ is formed between a surface formed by the center-part fixing portion 56_a_ (upper surface in the drawing) and a surface on the upstream side of the surface formed by the center-part fixing portion 56_a_ (side surface 56_d_ on the right side in the drawing) in the rotating direction R3. The corner part surface 56_c_ is a part chamfered by cutting out a corner part of the agitating member 45 and is shown by hatching. In this Embodiment, by providing the corner part surface 56_c_ as above, a phase when the agitating shaft 45_a_ rotates can distribute a torque required by the end-part fixing portion 56_b_, the center-part fixing portion 56_a_, and the corner part surface 56_c_, and a maximum torque can be decreased. That is, as compared with the conventional configuration as shown in the sectional view in FIG. 9B, according to the configuration of this Embodiment as in FIG. 9C, a force is applied at the end part in agitation with a right end in the X-direction of the end-part fixing portion 56_b_ as a fulcrum, and a force is applied at the center part more than at the end part of the center-part fixing portion 56_a_ with a lower end 56_e_ of the corner part surface 56_c_ as a fulcrum and thus, the total required torque can be decreased by shifting the timing when the force is applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-134586, filed on Aug. 22, 2023, which is hereby incorporated by reference wherein in its entirety.

What is claimed is:

1. A developing device which can be attached to an image forming apparatus, comprising:

a developer accommodating portion configured to accommodate developer;

a developing portion having a rotatable developer carrying member configured to bear the developer; and an agitating member disposed in the developer accommodating portion and configured to agitate the developer in the developer accommodating portion, wherein the developer accommodating portion and the developing portion are connected to each other via an opening portion;

before the developing device is attached to the image forming apparatus, a sealing sheet connected to the agitating member is fixed to a fixing portion in a periphery of the opening portion such that the opening portion is sealed;

after the developing device is attached to the image forming apparatus, the agitating member is operated, and the sealing sheet is removed from the fixing portion such that the developer accommodating portion and the developing portion communicate with each other;

wherein, a direction in which a rotation axis of the agitating member extends is a first direction, a projecting portion is provided on a downstream side of the fixing portion and on an upstream side of the opening portion in a second direction crossing the first direction; and a height of the projecting portion is higher than at least a part of a height of a fixing-position projecting portion formed at a fixing position.

2. The developing device according to claim 1, wherein the projecting portion is provided by being connected in series in the first direction.

3. The developing device according to claim 1, wherein the projecting portions are provided in plural with a gap provided in the first direction.

4. The developing device according to claim 1, wherein the projecting portion is provided by being connected in series, configured to surround the opening portion; and the fixing portion is provided in a periphery of the projecting portion.

5. The developing device according to claim 4, wherein the developing device is a recycled article; and the projecting portion is a fixing portion used for fixing the sealing sheet when the developing device was a non-recycled article.

6. The developing device according to claim 1, wherein the fixing-position projecting portion is a part formed by projecting when the sealing sheet is to be fixed on both sides of the fixing portion in the second direction; and a height of the projecting portion is within a predetermined range from a height of the fixing-position projecting portion.

7. The developing device according to claim 1, wherein the agitating member has a fixing portion configured to fix the sealing sheet; and an end-part fixing portion located at an end part in the first direction in the fixing portion has a length in the second direction shorter as compared with a center-part fixing portion located at a center part in the first direction.

8. The developing device according to claim 7, wherein the agitating member has a rotation phase in the center-part fixing portion different from the same in the end-part fixing portion.

9. The developing device according to claim 1, wherein after the developing device is attached to the image forming apparatus, and the sealing sheet is removed from the fixing portion, the sealing sheet is rotated with rotation of the agitating member and functions as a sheet which agitates the developer accommodated in the developer accommodating portion.

10. The developing device according to claim 1, wherein the agitating member has an agitating sheet configured to agitate the developer accommodated in the developer accommodating portion.

* * * * *